(12) United States Patent
Kodavanji et al.

(10) Patent No.: US 11,397,830 B2
(45) Date of Patent: Jul. 26, 2022

(54) SECURITY RULES COMPLIANCE FOR PERSONALLY IDENTIFIABLE INFORMATION

(71) Applicant: HEWLETT PACKARD ENTERPRISE DEVELOPMENT LP, Houston, TX (US)

(72) Inventors: Mashood Abdulla Kodavanji, Bangalore (IN); Srinivasan Varadarajan Sahasranamam, Bangalore (IN); Suhas Shivanna, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 216 days.

(21) Appl. No.: 16/750,669

(22) Filed: Jan. 23, 2020

(65) Prior Publication Data

US 2020/0250340 A1 Aug. 6, 2020

(30) Foreign Application Priority Data

Feb. 4, 2019 (IN) .............................. 201941004405

(51) Int. Cl.
*G06F 21/62* (2013.01)
*G06F 21/60* (2013.01)
*H04L 9/32* (2006.01)

(52) U.S. Cl.
CPC ........ *G06F 21/6254* (2013.01); *G06F 21/602* (2013.01); *H04L 9/3247* (2013.01)

(58) Field of Classification Search
CPC .............. G06F 21/602; G06F 21/6209; G06F 21/6254; G06F 21/6245; G06F 2221/2137; G06F 2221/2143; H04L 9/3247; H04L 2209/42
See application file for complete search history.

(56) References Cited

U.S. PATENT DOCUMENTS

| | | | |
|---|---|---|---|
| 8,275,850 B2 | 9/2012 | Kohan et al. | |
| 9,239,929 B1 | 1/2016 | Yan et al. | |
| 9,542,573 B2 | 1/2017 | Hughes et al. | |

(Continued)

FOREIGN PATENT DOCUMENTS

| | | |
|---|---|---|
| EP | 1660967 A1 | 5/2006 |
| WO | 2005/017720 A1 | 2/2005 |

OTHER PUBLICATIONS

Finjan Mobile, "Mobile Geo-Tagging", Feb. 14, 2017, 10 pages.

(Continued)

*Primary Examiner* — Olugbenga O Idowu
(74) *Attorney, Agent, or Firm* — Hewlett Packard Enterprise Patent Department (57) ABSTRACT

In an example, a first metadata tag and a second metadata tag are added to first Personally Identifiable Information (PII) of a first user handled by a first application. The first PII is to be part of call home data captured from a hosting system. The first metadata tag may be indicative of security rules to be complied with for the first application and the second metadata tag may be indicative of security rules to be complied with for the first user. The first PII, the first metadata tag, and the second metadata tag may be protected and transmitted to a data processing center. The transmission may be in response to a determination to transmit the call home data.

20 Claims, 6 Drawing Sheets

(56) References Cited

U.S. PATENT DOCUMENTS

| | | |
|---|---|---|
| 2012/0135751 A1 | 5/2012 | Mishra |
| 2017/0140174 A1 | 5/2017 | Lacey et al. |
| 2017/0286719 A1 | 10/2017 | Krishnamurthy et al. |
| 2017/0308715 A1* | 10/2017 | Drost-Hansen ..... G06F 21/6245 |
| 2017/0344754 A1* | 11/2017 | Kumar ................ H04M 3/5175 |
| 2018/0218167 A1 | 8/2018 | Narayanaswamy et al. |
| 2019/0333054 A1* | 10/2019 | Cona ................... G06F 21/6272 |

OTHER PUBLICATIONS

Pearson et al., "Context-Based Entitlements Prevent Accidental Data Disclosure and Exhibit the Best of Privacy by Design", Ionic Security, Sep. 28, 2017, pp. 1-7.

\* cited by examiner

SECURITY RULES COMPLIANCE FOR PERSONALLY IDENTIFIABLE INFORMATION

BACKGROUND

Personally identifiable information (PII) may refer to information that can be used to identify, contact, or locate a person, or to identify a person in context. Examples of PII are name, age, address, and phone number. The PII of a person may be received by a computing system in a variety of scenarios. For example, a computing system running a healthcare-related application may receive information like age, ailments, and other health-related parameters of persons. The PII, being sensitive information, may be associated with security rules to be complied with. For example, a security rule may specify that the PII is to be encrypted using a particular encryption standard.

BRIEF DESCRIPTION OF DRAWINGS

The following detailed description references the figures, wherein.

DETAILED DESCRIPTION

Personally Identifiable Information (PII) of persons may be received by computing systems. Further, the computing systems may handle the PII, such as store, process, backup, or transfer the PII for various reasons. For example, a computing system may host an application that receives PII of users. The computing system may capture call home data, such as alarms, logs, core dump, and telemetry data, and may transfer the call home data to a processing center for further processing, such as for troubleshooting, predictive maintenance, or the like. The call home data may include the PII.

Sometimes, the PII may be associated with security rules, which specify the manner in which the PII is to be handled. For example, a security rule may specify that PII of a person from a particular country is to be stored within the territorial limits of the country. As another example, the owner of an application hosted by a computing system may specify that the PII received by the application is to be protected using a particular encryption standard and is not to be stored beyond a particular expiry period. Failure to comply with such security rules may attract penalties.

The present subject matter relates to compliance with security rules associated with Personally Identifiable Information (PII). With the implementations of the present subject matter, security rules associated with PII can be complied with by computing systems handling the PII.

In accordance with an example implementation, first Personally Identifiable Information (PII) of a first user may be received from a first application hosted on a hosting system. The first PII may have to be included in call home data captured from the hosting system. For example, core dump captured from the hosting system may include the first PII. A first metadata tag and a second metadata tag may be added to the first PII. The first metadata tag may be indicative of security rules to be complied with for the first application. For example, the first metadata tag may include information of a type of the first application (e.g., an industry to which the first application relates) and security settings to be applied to all PII from the application. Further, the second metadata tag may be indicative of security rules to be complied with for the first user. For example, the second metadata tag may include information of the location or citizenship of the first user, based on which a geographical boundary within which the first PII is to be stored may be determined.

The first PII, the first metadata tag, and the second metadata tag may be protected to prevent their unauthorized access. For example, the first PII, the first metadata tag, and the second metadata tag may be encrypted or protected using a signature-based protection mechanism. In response to a determination to transmit the call home data, the protected first PII, the protected first metadata tag, and the protected second metadata tag may be transmitted to a data processing center, where the PII may be processed.

The data processing center may handle the first PII such that the compliance rules associated with the first PII are complied with. For example, security settings specified by the first application may be applied to the first PII and the first PII may be stored within the geographical boundary or for a particular time period as specified by the security settings.

The present subject matter reduces the complexity associated with managing PII and standardizes PII management across multiple geographical locations using appropriate security controls, thereby ensuring conformance across the lifetime of different types of PII. Since the PII is tagged with information indicative of security rules to be complied with for the PII, the present subject matter ensures compliance with security rules associated with the PII even if the PII is moved from one computing system to another. Therefore, security rules specified by owners of applications and governments can be complied with in a simple and effective manner. The present subject matter can be used for handling PII present in call home data, such as core dump, logs, alarms, and telemetry data.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Figure 1:
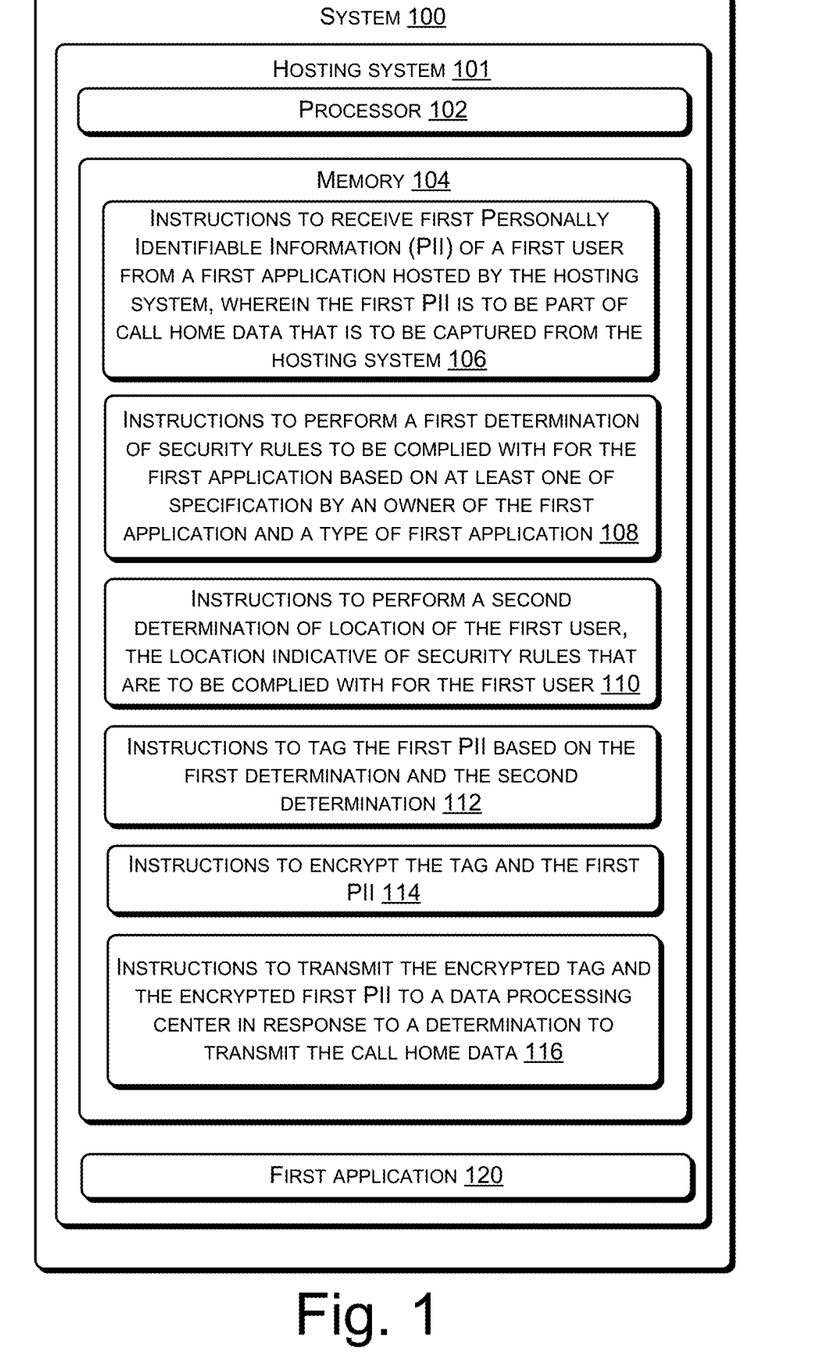
FIG. 1 illustrates a system to facilitate compliance with security rules associated with Personally identifiable information (PII), according to an example implementation of the present subject matter.

FIG. 1 illustrates a system 100 to facilitate compliance with security rules associated with Personally Identifiable Information (PII), according to an example implementation of the present subject matter. The system 100 includes a hosting system 101. The hosting system 101 may be implemented as any of a variety of computing devices, such as a desktop computer, a laptop computer, a server, a tablet, and the like. In an example, the hosting system 101 may be a data center having a plurality of computing devices. The hosting system 101 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in the memory 104. The computer-readable instructions, hereinafter referred to as instructions, includes instructions 106, instructions 108, instructions 110, instructions 112, instructions 114, and instructions 116. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the hosting system 101 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable receiving first PII of a first user from a first application 120 hosted on the hosting system 101. The first application 120 may be, for example, a banking-related application or a healthcare-related application. In an example, the first PII may differ depending on a type of the first application 120. For instance, in case of a healthcare-related application, the first PII may include name, age, and ailments of the first user, while in case of a banking-related application, the first PII may include details of financial accounts of the first user, details of payment card of the first user, and the like. The type of an application may also be referred to as an associated industry of the application.

In an example, the first PII may have to be included in call home data captured from the hosting system 101. The call home data from the hosting system 101 may include data that can be used for troubleshooting, reactive maintenance, or proactive maintenance, repairing, or the like of an application hosted by the hosting system 101, of a part of the hosting system 101, or of the whole of the hosting system 101. For example, the call home data may include at least one of telemetry data, active health system logs, inventory data, alarm data, and core dump data.

Subsequently, security rules to be complied with for the first application 120 are determined. The determination may be performed with the help of the instructions 108. Such a determination may be referred to as a first determination, and may be performed based on at least one of a specification by an owner of the first application 120 and the type of first application.

Further, location of the first user is determined. The determination of the location may be referred to as a second determination, and may be performed with the help of the instructions 110. The location of the first user may be, for example, a town, state, or a country of residence of the first user. The location of the user may be indicative of security rules to be complied with for the first user. The first determination and the second determination will be explained in greater detail with reference to FIG. 2. The security rules to be complied with for the first PII, due to the first application, due to country of residence of the first user, and due to other specifications, may be collectively referred to as security rules corresponding to the first PII or security rules associated with the first PII.

Then, the first PII may be tagged based on the first determination and the second determination. The tagging is facilitated by the instructions 112. In an example, the first PII may be tagged with a first metadata tag and a second metadata tag. Further, the tag and the first PII are encrypted. The tagging and encryption of the first PII may be performed with the help of the instructions 114, and will be explained in greater detail with reference to FIG. 2.

Subsequently, in response to a determination that the call home data is to be transmitted, the encrypted tags and the encrypted first PII are transmitted to a data processing center (not shown in FIG. 1). The determination that the call home data is to be transmitted may be, for example, part of a determination that the call home data is to be captured from the hosting system 101 and is to be transmitted to the data processing center. The determination to capture and transmit the call home data, in turn, may be performed, for example, in response to a failure of the hosting system 101, failure of a part of the hosting system 101, failure of the first application 120, elapsing of a predetermined period of time, or the like. In an example, if the call home data is to be captured in response to failure of the hosting system 101, the hosting system 101 may capture the call home data and tag the first PII upon recovery of from the failure.

Figure 2:
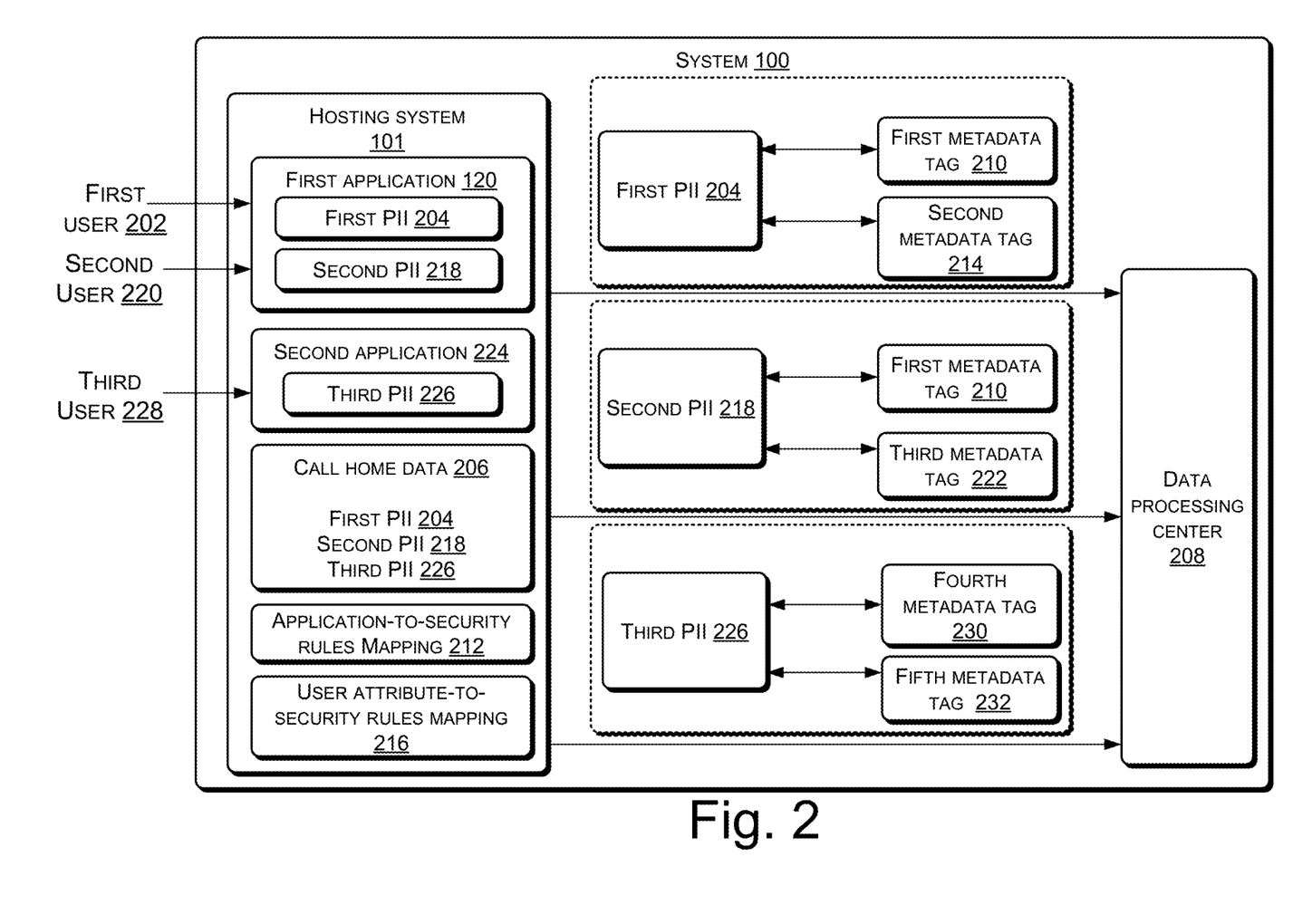
FIG. 2 illustrates a system for complying with security rules corresponding to PII, according to an example implementation of the present subject matter.

FIG. 2 illustrates the system 100 for complying with security rules corresponding to PII, according to an example implementation of the present subject matter. The system 100 may include the hosting system 101. As mentioned earlier, the hosting system 101 may be any of a variety of computing systems, such as laptop computer, desktop computer, server, or the like. In an example, the hosting system 101 may be a data center, such as an on-premises data center, which is a data center that is owned and/or controlled by an organization that runs applications on the data center. In an example, instances of the first application 120 may be hosted on one or more Virtual Machines (VMs) or containers running on the hosting system 101 or may be hosted directly on a computing device of the hosting system 101.

A first user 202 may interact with the first application 120 for performing one or more functions. For example, as mentioned earlier, the first application 120 may be a banking-related application. In such a case, the first user 202 may interact with the first application 120 for performing banking transactions. During interaction with the first application 120, the first user 202 may share some PII about himself with the first application 120. For example, to perform the banking transactions, the first user 202 may share his name, user identifier (ID), bank account details, and the like with the first application 120. The PII of the first user 202 may be referred to as first PII 204. In addition to the details consciously shared by the first user 202, the first PII 204 may also include details shared by the first user 202 with the first application 120 without his knowledge. Such details may include, for example, Internet Protocol (IP) address of a computing device used by the first user 202.

In some examples, a computing system receiving first PII 204, such as the hosting system 101, may have to comply with certain compliance rules associated with the first PII 204 for handling the first PII 204. Such compliance rules may be specified, for example, by a government of a country in which the first user 202 resides, a government of a country of which the first user 202 is a citizen, an entity that owns the first application 120 (e.g., a bank to which the first application 120 belongs) (also referred to as owner of the first application 120), or by the first user 202 himself. In some examples, the compliance rules may specify that the first PII 204 should not be backed up outside the country of residence of the first user 202, the first PII 204 should not be accessible beyond a particular expiry date, and the first PII 204 should be encrypted using a minimum level of encryption. Such compliance rules are to be considered while handling, such as processing, storing, transferring, and backing-up the first PII 204.

In some cases, the first PII 204 may have to be transferred from the hosting system 101 to another system. For example, the first PII 204 may have to be transferred as part of call home data 206 that is transferred to a remote system, such as a data processing center 208, which can process the call home data 206. The data processing center 208 can process the call home data 206 for troubleshooting, maintenance, or the like. Therefore, the data processing center 208, which receives the first PII 204, is to handle the first PII 204 such that the security rules associated with the first PII 204 are complied with. To facilitate compliance with the security rules during the handling of the first PII 204, the hosting system 101 may add metadata tags to the first PII 204. The addition of metadata tags to the first PII 204 may also be referred to as tagging the first PII 204.

In an example, the metadata tags added may include a first metadata tag 210, which may be indicative of security rules to be complied with for the first application 120. The addition of the first metadata tag 210 to the first PII 204 is illustrated by a double-headed arrow connecting the first metadata tag 210 and the first PII 204. The security rules to be complied with for an application may include security rules specified by an owner of the application ("application owner"). For example, the owner of the application may specify that the PII received by the application is to be protected using a minimum encryption level, such as Advanced Encryption Standard (AES)-128 bit, AES-256, or the like, before it is backed up, or that the PII is to be accessed by a specific user or set of users alone. The security rules to be complied with for an application may also include security rules to be complied with for applications of a particular type. For instance, an industry to which the application is related may have corresponding regulations, such as statutory regulations, which may specify the manner in which the data received by the application is to be protected. For example, a healthcare-related application may have a corresponding standard, such as Health Insurance Portability and Accountability Act of 1996 (HIPAA). Similarly, a banking-related application may have a corresponding standard, such as a standard specified by a federal bank of a country. Further, a payment card-related application may have a Payment Card Industry Data Security Standard (PCI DSS standard). Such standards may specify the security settings, such as minimum encryption level.

To indicate the security rules to be complied with for the first application 120, in an example, the first metadata tag 210 may specify name of the first application 120 or a type of the first application 120. Based on the name or the type of the first application 120, the data processing center 208 may deduce the security rules to be complied with.

In another example, to indicate the security rules to be complied with, the hosting system 101 may perform a determination of the security rules to be complied with for the first application 120 and generate the first metadata tag 210 accordingly. For example, the first metadata tag 210 generated may include information of the minimum encryption level specified by the owner of the first application 120. As will be understood, the information in the first metadata tag 210 may vary depending on the security rules to be complied with. The information that may be included in the first metadata tag 210, in accordance with an example, will be explained with reference to FIG. 3(a). In an example, the security rules to be complied with for the first application 120 may be determined based on a mapping between an application and its corresponding security rules. Such a mapping may be referred to as application-to-security rules mapping 212, and may be stored in the hosting system 101, as illustrated in FIG. 2. Further, in an example, the hosting system 101 may receive the security rules to be complied with for the first application 120 from the owner of the first application 120 along with service level agreement (SLA) parameters for the first application 120. In other words, the hosting system 101 may derive the security rules to be complied with from the SLA parameters provided by the owner of the first application 120. This reduces the burden on the owner of the first application 120, and also make the process of generating the first metadata tag 210 highly efficient and automated.

In an example, in addition to being indicative of the security rules for the owner of first application 120, the first metadata tag 210 may also be indicative of security rules specified by an organization that manufactured the computing devices (manufacturing organization) that are part of the hosting system 101 or an organization that developed the first application 120 (developer organization) for the owner. Such security rules may be based on a privacy policy of the organization. In case of a conflict between security rules of the application owner and security rules of the manufacturing organization/developer organization, the security rules of the application owner may prevail. For example, if the application owner of the first application 120 specifies that the expiry period for PII is 6 months from the date of its receipt by the hosting system 101 and if the manufacturing organization specifies that the expiry period for PII is 9 months, the expiry period may be configured as 6 months.

The metadata tags added to the first PII 204 may also include a second metadata tag 214, which may be indicative of security rules to be complied with for the first user 202. Such security rules may be specified by the first user 202 himself, by a government of a country of residence of the first user 202, a government of a country of citizenship of the first user 202, and the like. Such security rules may specify, for example, that the first PII 204 should not be backed up outside the territory of the country of residence or the country of citizenship, that all copies of the first PII 204 should be permanently deleted beyond an expiry date, and the like.

To indicate the security rules to be complied with for the first user 202, in an example, the hosting system 101 may specify one or more attributes of the first user 202. The attributes of the first user 202 may include, for example, name, age, user identifier (ID), country of residence, and country of citizenship of the first user 202. The attributes of the first user 202 may be determined based on information provided by the first user 202 or by the first application 120 or may be automatically determined. For example, the country of residence of the first user 202 may be determined based on an IP address of the computing device used by the first user 202 or another method that can be used to determine the location of the computing device. The attributes specified may be such that, based on the attributes, the data processing center 208 can deduce the security rules to be complied with for the first user 202. In another example, the hosting system 101 may perform a determination of the security rules to be complied with for the first user 202 and generate the second metadata tag 214 accordingly. For instance, the second metadata tag 214 may include information of territorial restrictions for backing up of the first PII 204, expiry date for the first PII 204, and the like. As will be understood, the information in the second metadata tag 214 may vary depending on the security rules to be complied with. The information that may be included in the second metadata tag 214, in accordance with an example, will be explained with reference to FIG. 3(b). In an example, the security rules to be complied with for the first user 202 may be determined based on a mapping between user attributes and corresponding security rules. Such a mapping may be referred to as user attribute-to-security rules mapping 216, and may be stored in the hosting system 101, as illustrated in FIG. 2.

In an example, the tagging of the first PII 204 may be performed in response to a determination that the call home data 206 is to be transmitted from the hosting system 101, as the first PII 204 is to be part of the call home data 206 and will be transmitted from the hosting system 101. In another example, the tagging may be performed as and when information that can form part of the first PII 204 is received from the first user 202. In a further example, as will be explained later, the entire call home data 206 may be tagged, thereby ensuring the first PII 204, which is also part of the call home data 206, is also tagged. In other examples, tagging may be performed in response to other determinations and at other instances of time as well such that the first PII 204 is tagged before being transmitted from the hosting system 101.

In addition to the first PII 204, the first application 120 may handle PII of other users as well. For example, the first application 120 may handle second PII 218 of a second user 220. In such a case, the hosting system 101 may perform the first determination as to the security rules to be complied with for the first application 120, and add the first metadata tag 210 to the second PII 218 as well, as the second PII 218 is also handled by the first application 120, and the first metadata tag 210 corresponds to the first application 120. In addition, a third metadata tag 222 may be added to the second PII 218. The third metadata tag 222 may be indicative of security rules to be complied with for the second user 220. For instance, the third metadata tag 222 may specify the country of residence or country of citizenship of the second user 220. To add the third metadata tag 222, in an example, the hosting system 101 may perform a third determination of the location of the second user 220.

Further, in an example, the hosting system 101 may also host a second application 224 that may handle third PII 226 of a third user 228. In an example, the second application 224 may be of a type different from that of the first application 120. Accordingly, the hosting system 101 may add a fourth metadata tag 230 that is indicative of security rules to be complied with for the second application 224 and a fifth metadata tag 232 that is indicative of security rules to be complied with for the third user 228. For this, the hosting system 101 may perform a fourth determination of security rules to be complied with for the third PII 226 based on at least one of specification by an owner of the second application 224 and a type of second application 224. Based on the fourth determination, the hosting system 101 may tag the third PII 226.

From the above, it can be understood that a wide variety of tags can be added to the PII depending on the application and the user. Therefore, the present subject matter enables achieving a fine-grained tagging for the PII.

Subsequent to the tagging, and before transmission of the PII to the data processing center 208, the hosting system 101 may protect the PII and the corresponding tags to prevent their unauthorized access. For example, PII and the corresponding tags may be encrypted or protected using a signature-based protection. Here, signature-based protection may refer to protection based on a digital signature. For example, the hosting system 101 may sign the PII and tags using its digital signature. Upon receiving the PII and the tags, the data processing center 208 may verify the authenticity of the digital signature to verify that the PII and the tags have not been tampered with. In an example, the protection applied to the PII (such as the first PII 204) and its corresponding tags (such as the first metadata tag 210 and the second metadata tag 214) may be based on a specification of the corresponding application (such as the first application 120) or the corresponding user (such as the first user 202).

As will be understood, in addition to the protected sets of data, the remainder of the call home data 206, i.e., the portion of the call home data excluding the first PII 204, second PII 218, and third PII 226, may also be transmitted to the data processing center 208. In an example, the remainder of the call home data 206 may be transmitted without protection or with lesser protection compared to the PII. In another example, the entire call home data 206, including the first PII 204, second PII 218, and third PII 226, and all the metadata tags may be protected together and sent as a single set of protected data to the data processing center 208.

Although, in the above description, the PII corresponding to the different applications are explained as being tagged differently, in an example, the PII from different applications may be tagged similarly. This may be performed, for example, when the security rules corresponding to the different applications are similar. Further, in some cases, the PII of different users may be tagged similarly. This may be performed, for example, when the security rules corresponding to the different users are similar. For instance, when all the users who are interacting with the applications hosted in the hosting system 101 reside in the same country, the security rules corresponding to the users may be the same.

Although not shown in FIG. 2, in an example, the entire call home data 206 may be tagged with a single set of metadata tags. For example, the entire call home data 206 may be tagged with the first metadata tag 210 and the second metadata tag 214 alone. The tagging with a single set of metadata tags may be performed, for example, when the hosting system 101 is hosting a single type of application, such as the first application 120, or different applications having the same set of associated security rules, and is to handle PII from users having the same set of associated security rules. The users for whom PII is to be handled may have the same set of associated security rules, for example, if the hosting system 101 is located in the same country as that of the users' residence. In such a case, the hosting system 101 may add its own location to the second metadata tag 214. The hosting system 101 may determine its location based on its time zone settings.

In accordance with the above example, the hosting system 101 may capture the call home data 206 from the entire hosting system 101 or from any part thereof, such as from storage or memory (not shown in FIG. 2) of the hosting system 101, or from the application hosted on the hosting system 101, and then apply the first metadata tag 210 and the second metadata tag 214 to the call home data 206. Subsequently, the call home data 206, the first metadata tag 210, and the second metadata tag 214 may be protected and transmitted to the data processing center 208, as explained earlier. Even in such a case, since the first metadata tag 210 is indicative of the security rules to be complied with for the first application 120 and the second metadata tag 214 is indicative of the security rules to be complied with for the user, the present subject matter enables complying with the security rules for the PI 1 in an efficient manner. Further, even in such a case, since the PI 1 is part of the call home data 206 that is tagged, the PII may also be considered to be tagged.

Upon receiving the tags, the call home data 206, and the PI 1 (as part of or separately from the call home data 206), the data processing center 208 may handle the PI 1 based on the information available in the tags. The handling of the PI 1 by the data processing center 208 will be explained with reference to FIG. 4. In an example, the data processing center 208 may be a part of the system 100. In accordance with the example, the system 100 may include both the hosting system 101 and the data processing center 208, as illustrated in FIG. 2. In another example, the system 100 may include the hosting system 101 alone, and the data processing center 208 may be external to the system 100.

The tagging of the PII at the hosting system 101, where the PI 1 is first received, ensures effective compliance with the security rules. For instance, since the hosting system 101 may host several applications, each of which may have different security rules, the hosting system 101 can add tags to PII from different applications differently. Accordingly, when the PII from the different applications are received, the data processing center 208 can determine the security rules to be complied with for the different sets of PII, and handle the sets of PII accordingly. Similarly, tagging the PII based on the corresponding users at the hosting system 101 allows tagging PII of different users differently, thereby ensuring that the security rules corresponding to the different users are complied with. Therefore, the present subject matter provides a flexible and error-free manner of compliance with the security rules.

Figure 3A:
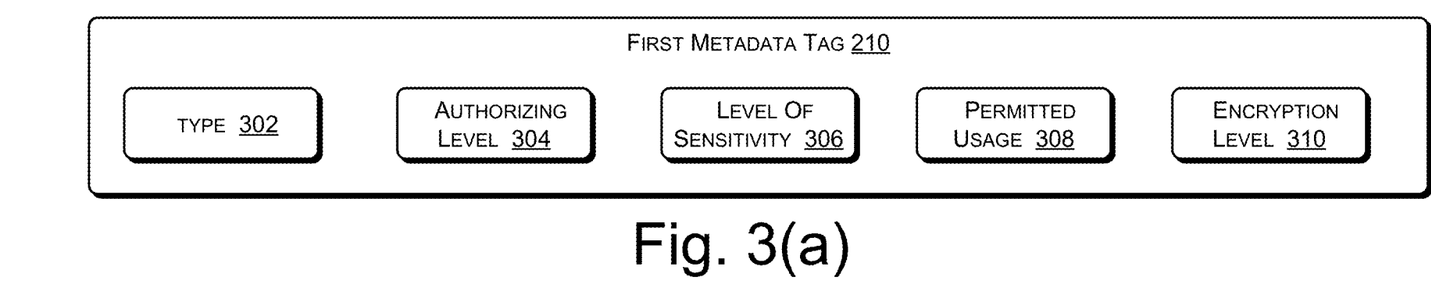
FIG. 3(a) illustrates a first metadata tag, according to an example implementation of the present subject matter.

FIG. 3(a) illustrates the first metadata tag 210, according to an example implementation of the present subject matter. As mentioned earlier, the first metadata tag 210 may include information that is indicative of the security rules to be complied with for the first application 120. The information may include, for example, type 302 of first application 120, authorization level 304 for the first application 120, level of sensitivity 306 for the first application 120, permitted usage 308 for the first application 120, and an encryption level 310 for the first application 120. As explained earlier, the type 302 of the first application 120 may be an associated industry for the first application 120, such as a healthcare industry, banking industry, or the like. The authorization level 304 for the first application 120 may specify the types of users who are authorized to access the first PII 204 and the level of access (e.g., read any, read after sanitization, read/write, and the like) for each type of users. The level of sensitivity 306 for the first application 120, as the name suggests, may specify the degree of sensitivity of the data of the first application 120. For example, the level of sensitivity of a banking-related application may be higher than that for a healthcare-related application. The permitted usage 308 for the first application 120 may specify the purpose for which the first PII 204 can be used. For instance, the permitted usage may specify that the first PII 204 can be used for troubleshooting purposes alone. The encryption level 310 for the first application 120 may specify a minimum encryption level with which the first PII 204 is to be protected.

Although FIG. 3(a) has been explained with reference to adding the first metadata tag 210 to the first PII 204 alone, in an example, the first metadata tag 210 may be added to the entire set of data handled by the first application 120. In another example, the first application 120 may specify a portion of the data handled by the first application 120 for which the security rules are to be complied with. For instance, the first application 120 may specify that the security rules are to be complied with for alarm data alone. The first application 120 may specify a portion of the data handled by it, for example, if the first PII 204 is present in that portion of the data alone. Such a specification may be provided by the owner of the first application 120. Based on the specification, the hosting system 101 may determine the portion of call home data 206, and applies the tags to the portion.

Figure 3B:
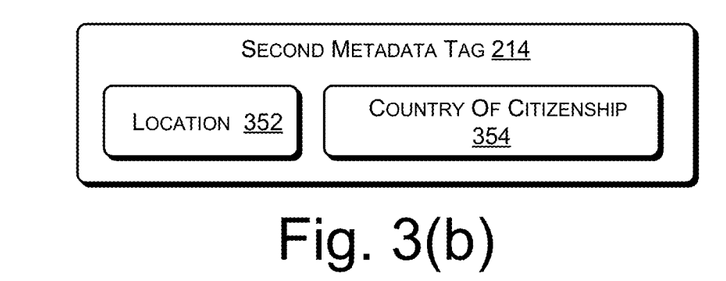
FIG. 3(b) illustrates a second metadata tag, according to an example implementation of the present subject matter.

FIG. 3(b) illustrates the second metadata tag 214, according to an example implementation of the present subject matter. The second metadata tag 214 may include information of a location 352 of the first user 202, and a country of citizenship 354 of the first user 202. The location of the first user 202 may be country of residence of the first user 202. Alternatively, the location of the first user 202 may be a town, city, or state in which the first user 202 resides. As mentioned earlier, in an example, the location 352 of the first user 202 may be the location of the hosting system 101 if the hosting system 101 is located in the same country as the residence of the first user 202.

Figure 4:
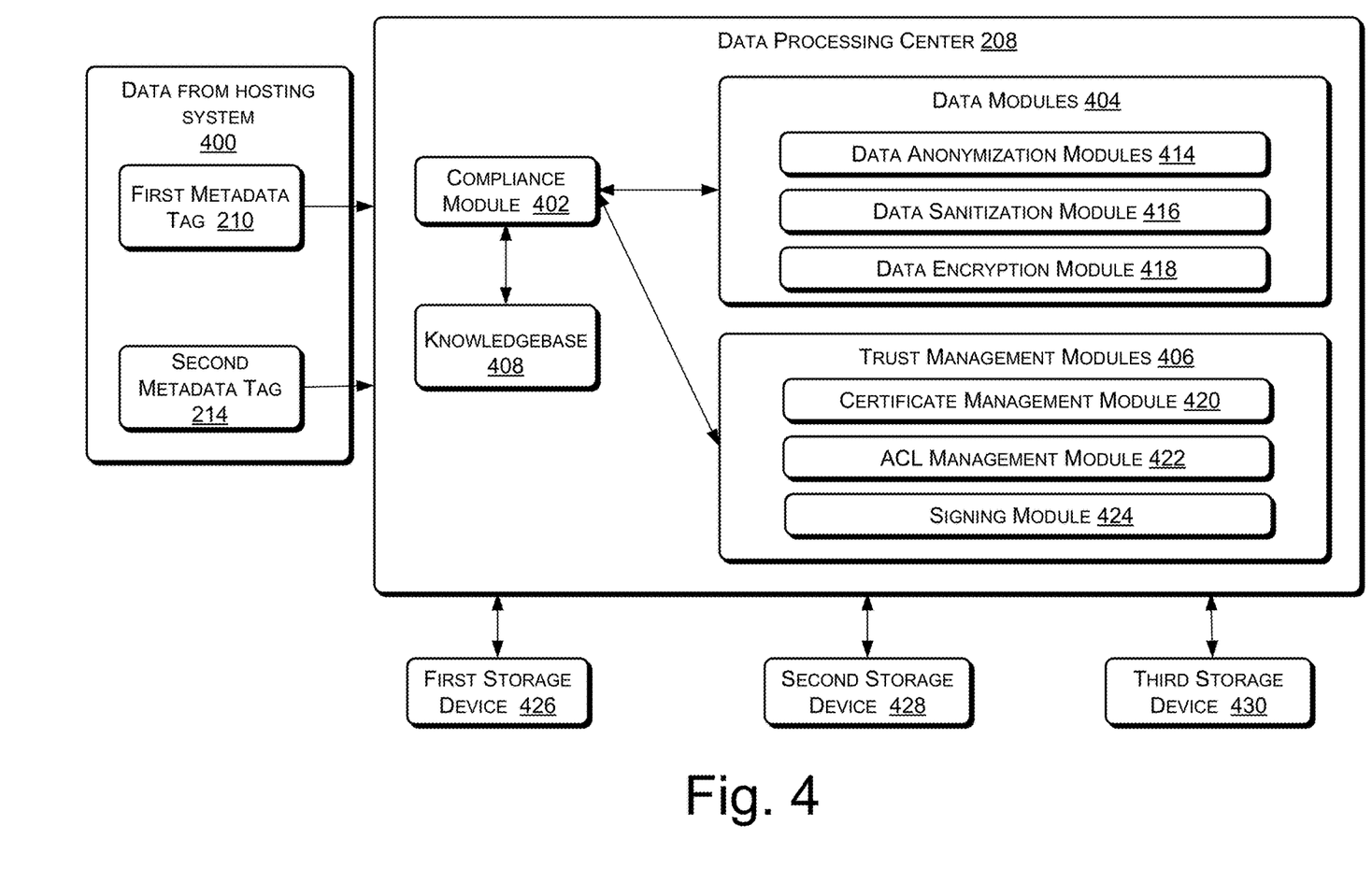
FIG. 4 illustrates a data processing center, according to an example implementation of the present subject matter.

FIG. 4 illustrates the data processing center 208, according to an example implementation of the present subject matter. The data processing center 208 may include any of a variety of computing systems, such as a desktop computer, a laptop computer, a server, a tablet, and the like. In an example, the data processing center 208 may be a data center located remotely from the hosting system 101. The data processing center 208 may belong to a manufacturing organization, which manufactured computing devices that are part of the hosting system 101, or may belong to a developer organization, which developed the first application 120 or the second application 224.

The data processing center 208 may be connected to the hosting system 101 through a communication network (not shown in FIG. 4) to receive data 400 from the hosting system 101. The data 400 may include the encrypted tags, such as the first metadata tag 210 and the second metadata tag 214, and the encrypted PII, such as the first PII 204. The communication network may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

The data processing center 208 may include a compliance module 402, a set of data modules 404, a set of trust management modules 406, and a knowledgebase 408. The modules may include, amongst other things, routines, programs, objects, components, data structures, and the like, which perform particular tasks or implement particular abstract data types, and may be coupled to and/or be executable by a processor of the data processing center 208. Further, the knowledgebase 408 may be stored in a memory of the data processing center 208.

The set of data modules 404 may also be referred to as data modules 404, and includes a data anonymization module 414, a data sanitization module 416, and a data encryption module 418. The data anonymization module 414 can remove PII from a given set of data. The data sanitization module 416 can permanently and irreversibly remove or destroy data stored on a storage device. Further, the data encryption module 418 can encrypt a given data set using an encryption algorithm.

The set of trust management modules 406 may also be referred to as trust management modules 406, and includes a certificate management module 420, an Access Control List (ACL) management module 422, and a signing module 424. The ACL management module 422 can specify which users or system processes are granted access to a data set, and what operations are allowed on the data set. The certificate management module 420 may manage certificates of the data processing center 208 that can be used to establish trust with other computing devices. The signing module 424 may be used to sign the certificates of the data processing center 208.

The knowledgebase 408 may include a mapping of country of residence with corresponding security rules, a mapping of country of citizenship with corresponding security rules, a mapping of an application and corresponding security rules, and the like.

The compliance module 402 may handle the PII received from the hosting system 101 based on the metadata tags such that the compliance rules associated with the PII are complied with. For this, the compliance module 402 may utilize the data modules 404, trust management module 406, and knowledgebase 408. For instance, if the first metadata tag 210 includes the name or type of the first application 120, the compliance module 402 may utilize the mapping present in the knowledgebase 408 to determine the security rules corresponding to the first application 120. Similarly, if the second metadata tag 214 includes the name of the country of residence of the first user 202, the compliance module 402 can determine the corresponding security rules based on the mapping present in the knowledgebase 408.

The compliance module 402 can protect the PII based on the metadata tags, such as the first metadata tag 210 and the second metadata tag 214, using the data modules 404. For instance, based on the first metadata tag 210, if the compliance module 402 determines that the first PII 204 is to be protected using a particular minimum encryption level, the compliance module 402 can utilize the data encryption module 418 to encrypt the first PII 204 accordingly. Further, based on the first metadata tag 210, the compliance module 402 may determine that the first PII 204 is to be protected using a particular sanitization algorithm, and may instruct the data sanitization module 416 to utilize the appropriate sanitization algorithm to sanitize the first PII 204. Still further, the compliance module 402 can utilize the ACL management module 422 to attach an ACL to the first PII 204 to control access to the first PII 204 based on, for example, the authorization level specified in the first metadata tag 210. In an example, the sanitization and anonymization of the data received from the hosting system 101 may be performed when such data is to be sent to a computing system that is not trusted by the hosting system 101.

In addition to protecting the PII, the compliance module 402 may also create backups of the PII in a storage device located in a particular geographical location, such that security settings are complied with. For instance, the data processing center 208 may be connected to various storage devices, such as a first storage device 426, a second storage device 428, and a third storage device 430, which may be distributed across multiple geographical locations, and the PII may have to be backed up in one of the storage devices for future analysis. In such a case, the compliance module 402 may select a storage device for storage of the PII based on the metadata tags. For example, if, based on the second metadata tag 214, the compliance module 402 determines that the first PII 204 is to be stored within a particular geographical boundary (e.g., within the country of residence of the first user 202), the compliance module 402 may select the storage device within the geographical boundary, and store the first PII 204 in that storage device.

The compliance module 402 may also configure an expiry date for the PII based on a metadata tag. For instance, based on the country of residence specified in the second metadata tag 214 and a mapping between the country of residence and expiry date in the knowledgebase 408, the compliance module 402 may determine a corresponding expiry date for the first PII 204. Further, the compliance module 402 may ensure that no copy of the first PII 204 is available beyond the configured expiry date. For instance, the compliance module 402 may delete the backup of the first PII 204 stored in the selected storage device, such as the first storage device 426, second storage device 428, or third storage device 430, upon completion of the expiry date. In another example, the compliance module 402 may instruct the data sanitization module 416 to delete all copies of the first PII 204.

To comply with the security rules, in an example, the compliance module 402 may utilize functionalities provided by operating system (OS) or filesystem of the data processing center 208. For example, if the OS or the filesystem supports ACL functionality, the compliance module 402 may utilize the ACL functionality. Also, if a functionality of the OS or filesystem enables configuring an expiry date and provides an alert upon reaching the expiry date, the compliance module 402 may utilize the functionality to delete the PII once the expiry date is reached. Further, other technical controls provided by the OS and filesystem may be utilized by the compliance module 402. In case the OS or filesystem do not provide functionalities to comply with the security rules, the compliance module 402 may, by itself, ensure compliance with the security rules. For example, the compliance module 402 may check for the expiry date and delete the PII once the expiry date is reached.

Although the compliance module 402 is explained as handling (encrypting, configuring expiry date, backing up, and the like) the PII alone, it is to be understood that the compliance module 402 can be used to handle other types of data as well. For example, if the entire call home data 206 is tagged using the first metadata tag 210 and the second metadata tag 214, the compliance module 402 can handle the entire call home data 206 based on the first metadata tag 210 and the second metadata tag 214.

Figure 5:
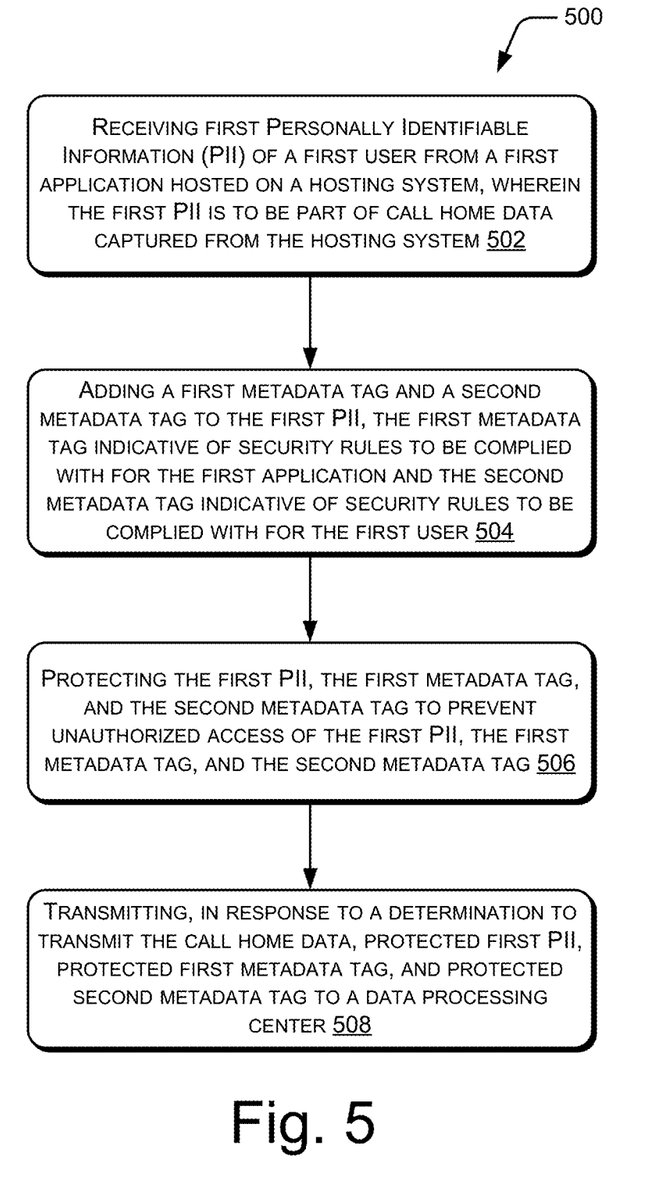
FIG. 5 illustrates a method for facilitating compliance with security rules associated with Personally Identifiable Information (PII), according to an example implementation of the present subject matter.

FIG. 5 illustrates a method 500 for facilitating compliance with security rules associated with Personally identifiable information (PII), according to an example implementation of the present subject matter.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 500 may be implemented in a variety of systems; the methods 500 are described in relation to the aforementioned system 100, for ease of explanation. In an example, the steps of the method 500 may be performed by a processing resource, such as the processor 102.

Referring to method 500, at block 502, first Personally Identifiable Information (PII) of a first user is received from a first application, such as the first application 120, hosted on a hosting system, such as the hosting system 101. The first PII is to be part of call home data captured from the hosting system.

At block 504, a first metadata tag and a second metadata tag are added to the first PII. The first metadata tag may be indicative of security rules to be complied with for the first application and the second metadata tag may be indicative of security rules to be complied with for the first user. The first metadata tag may be, for example, the first metadata tag 210 and the second metadata tag may be, for example, the second metadata tag 214.

At block 506, the first PII, the first metadata tag, and the second metadata tag may be protected to prevent unauthorized access of the first PII, the first metadata tag, and the second metadata tag. The protection may be, for example, based on digital signature or using an encryption algorithm, as explained above.

At block 508, the protected first PII, the protected first metadata tag, and the protected second metadata tag are transmitted to a data processing center in response to a determination to transmit the call home data.

The method 500 may also include receiving, by the data processing center, the protected first PII, the protected first metadata tag, and the protected second metadata tag. Further, the method 500 may include protecting, by the data processing center, the first PII to comply with the security rules for the first application and the security rules for the first user. Still further, the method may include selecting, by the data processing center, a location in which the first PII is to be backed up based on the second metadata tag. For example, the data processing center may select a storage device within a particular geographical boundary in which the first PII is to be backed up based on the second metadata tag, as explained with reference to FIG. 4.

In an example, the first application may handle second PII of a second user. In such a case, the method 500 may include receiving the second PII from the first application, adding the first metadata tag and a third metadata tag to the second PII. The third metadata tag may be for example, the third metadata tag 222, and may be indicative of security rules that are to be complied with for the second user.

Further, in an example, the hosting system may host a second application that is to handle third PII of a third user. The second application may be, for example, the second application 224. In such a case, the method 500 may also include receiving the third PII from the second application, adding a fourth metadata tag and a fifth metadata tag to the third PII. The fourth metadata tag may be, for example, 230, and may be indicative of security rules that are to be complied with for the second application. The fifth metadata tag may be indicative of security rules that are to be complied with for the third user, and may be, for example, the fifth metadata tag 232.

Figure 6:
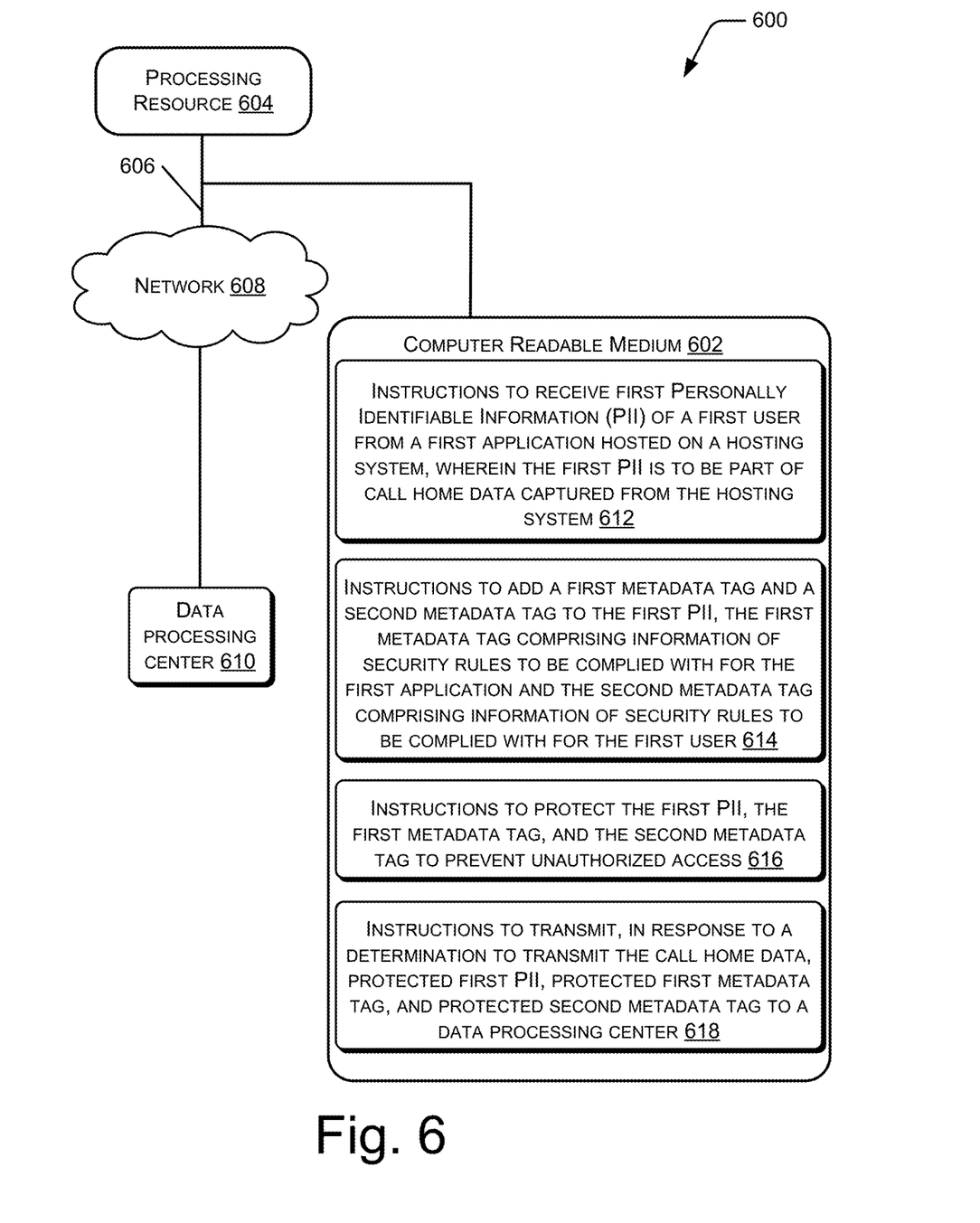
FIG. 6 illustrates a computing environment, implementing a non-transitory computer-readable medium for facilitating compliance with security rules associated with Personally Identifiable Information (PII), according to an example implementation of the present subject matter.

FIG. 6 illustrates a computing environment 600, implementing a non-transitory computer-readable medium 602 for facilitating compliance with security rules associated with Personally identifiable information (PII), according to an example implementation of the present subject matter.

In an example, the non-transitory computer-readable medium 602 may be utilized by a system, such as the hosting system 101. In an example, the computing environment 600 may include a processing resource 604 communicatively coupled to the non-transitory computer-readable medium 602 through a communication link 606.

In an example, the processing resource 604 may be implemented in a system, such as the hosting system 101. The processing resource 604 may be the processor 102. The non-transitory computer-readable medium 602 may be, for example, an internal memory device or an external memory device. In one implementation, the communication link 606 may be a direct communication link, such as any memory read/write interface. In another implementation, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a data processing center 610 over the network 608. The data processing center 610 may be, for example, the data processing center 208.

In an example implementation, the non-transitory computer-readable medium 602 includes a set of computer-readable instructions to facilitate compliance with security rules associated with PII. The set of computer-readable instructions can be accessed by the processing resource 604 through the communication link 606 and subsequently executed.

Referring to FIG. 6, in an example, the non-transitory computer-readable medium 602 includes instructions 612 that cause the processing resource 604 of a hosting system to receive first Personally Identifiable Information (PII) of a first user from a first application hosted on the hosting system. The first PII is to be part of call home data captured from the hosting system. The hosting system may be, for example, the hosting system 101, and the first application may be, for example, the first application 120.

The non-transitory computer-readable medium 602 includes instructions 614 that cause the processing resource 604 to add a first metadata tag and a second metadata tag to the first PII. The first metadata tag may include information of security rules to be complied with for the first application and the second metadata tag may include information of security rules to be complied with for the first user. The first metadata tag may be, for example, the first metadata tag 210 and the second metadata tag may be, for example, the second metadata tag 214.

The non-transitory computer-readable medium 602 includes instructions 616 that cause the processing resource 604 to protect the first PII, the first metadata tag, and the second metadata tag to prevent unauthorized access.

The non-transitory computer-readable medium 602 includes instructions 618 that cause the processing resource 604 to transmit protected first PII, protected first metadata tag, and protected second metadata tag to the data processing center 610. The transmission may be performed in response to a determination to transmit the call home data to the data processing center 610.

In an example, the computer-readable medium 602 includes instructions to receive second PII of a second user from the first application and to add the first metadata tag and a third metadata tag to the second PII. The third metadata tag may be, for example, the third metadata tag 222, and may include information of security rules to be complied with for the second user. The computer-readable medium 602 may also include instructions to receive third PII of a third user from a second application hosted on the hosting system and add a fourth metadata tag to the third PII. The fourth metadata tag may be, for example, the fourth metadata tag 230, and may include information of security rules that are to be complied with for the second application.

Further, in an example, the computer-readable medium 602 includes instructions to receive the protected first PII, protected first metadata tag, and protected second metadata tag and handle the first PII based on the first metadata tag and the second metadata tag to comply with the security rules for the first application and the security rules for the first user. The instructions in accordance with the example may be executed by a second processing resource of the data processing center 610.

The present subject matter provides a flexible and comprehensive solution for complying with security rules associated with PII. The present subject matter ensures that various privacy policies of application owners, users, and statutory standards are complied with at all points of time during the lifetime of the PII using metadata tags that are added at source of data. Also, the present subject matter automatically enforces technical controls and security settings based on metadata tags.

The present subject matter facilitates adding metadata tags that have accurate and exhaustive information of the security settings to be applied for the PII. Further, such tagging may be performed with minimal inputs from the users.

Further, the present subject matter reduces the complexity associated with managing the PII information and standardizes PII management across multiple geographical locations using appropriate security controls, thereby ensuring conformance across the lifetime of different types of PII. The addition of metadata tags at the source enables a highly flexible, error-proof, and comprehensive compliance with security rules for a wide variety of applications and for a wide variety of users.

Although implementations of security rules compliance for personally identifiable information have been described in language specific to structural features and/or methods, it is to be understood that the present subject matter is not necessarily limited to the specific features or methods described. Rather, the specific features and methods are disclosed and explained as example implementations.

We claim:

1. A method comprising:
 receiving, by a processing resource of a hosting system, first Personally Identifiable Information (PII) of a first user from a first application hosted on the hosting system, wherein the first PII is to be part of call home data captured from the hosting system;
 determining first security rules to be complied with for the first application;
 determining second security rules to be complied with for the first user;
 responsive to the determination of the first security rules and the determination of the second security rules, adding, by the processing resource, a first metadata tag and a second metadata tag to the first PII, the first metadata tag being indicative of the first security rules and the second metadata tag being indicative of the second security rules;
 protecting, by the processing resource, the first PII, the first metadata tag, and the second metadata tag to prevent unauthorized access of the first PII, the first metadata tag, and the second metadata tag; and
 transmitting, by the processing resource, in response to a determination to transmit the call home data, the protected first PII, the protected first metadata tag, and the protected second metadata tag to a data processing center.

2. The method of claim 1, wherein the first application is to handle second PII of a second user and the method further comprises:
 receiving the second PII from the first application;
 adding the first metadata tag to the second PII; and
 adding a third metadata tag to the second PII,
 wherein the third metadata tag is indicative of security rules that are to be complied with for the second user.

3. The method of claim 2, further comprising:
 receiving third PII of a third user from a second application hosted on the hosting system; and
 adding a fourth metadata tag to the third PII, the fourth metadata tag being indicative of security rules that are to be complied with for the second application; and
 adding a fifth metadata tag to the third PII, the fifth metadata tag being indicative of security rules that are to be complied with for the third user.

4. The method of claim 1, wherein the first metadata tag comprises information of an authorization level for the first application, a type of first application, a level of sensitivity for the first application, permitted usage for the first application, and an encryption level for the first application.

5. The method of claim 1, wherein the second metadata tag comprises information of at least one of location and citizenship of the first user.

6. The method of claim 1, comprising determining a portion of the call home data for which the first metadata tag is to be applied based on a specification by an owner of the first application, wherein the portion of the call home data comprises the first PII.

7. The method of claim 1, wherein the call home data is one of telemetry data, inventory data, alarm data, and core dump data.

8. The method of claim 1, comprising protecting the first PII and the first metadata tag using at least one of digital signature-based protection and encryption.

9. The method of claim 1, comprising:
receiving, by the data processing center, the protected first PII, protected first metadata tag, and protected second metadata tag;
protecting, by the data processing center, the first PII to comply with the first security rules and the second security rules; and
selecting, by the data processing center, a location in which the first PII is to be backed up based on the second metadata tag.

10. The method of claim 9, comprising protecting, by the data processing center, the first PII using at least one of: an access control list (ACL), an encryption level, configuration of expiry date of the first PII, a sanitization mechanism, and anonymization.

11. The method of claim 1, comprising receiving the first security rules from an owner of the first application along with service level agreement (SLA) parameters for the first application.

12. A system comprising:
a hosting system comprising:
a processor; and
a memory coupled to the processor, the memory storing instructions executable by the processor to:
receive first Personally identifiable information (PII) of a first user from a first application hosted on the hosting system, wherein the first PII is to be part of call home data that is to be captured from the hosting system;
perform a first determination of first security rules to be complied with for the first application based on at least one of specification by an owner of the first application and a type of first application;
perform a second determination of location of the first user, the location being indicative of second security rules that are to be complied with for the first user;
tag the first PII based on the first determination and the second determination to provide a tag, wherein the tagging comprises tagging the first PII with a metadata tag representing the first security rules and the second security rules;
encrypt the tag to provide an encrypted tag and encrypt the first PII to provide an encrypted first PII; and
in response to a determination to transmit the call home data, transmit the encrypted tag and the encrypted first PII to a data processing center.

13. The system of claim 12, wherein the first application is to handle second PII of a second user and the instructions are executable by the processor to:
perform a third determination of location of the second user; and
tag the second PII based on the first determination and the third determination.

14. The system of claim 13, wherein the instructions are executable by the processor to:
receive third PII of a third user from a second application hosted on the hosting system;
perform a fourth determination of security rules to be complied with for the third PII based on at least one of specification by an owner of the second application and a type of second application; and
tag the third PII based on the fourth determination.

15. The system of claim 12, wherein the tag comprises information of authorization level for the first application, the type of first application, level of sensitivity for the first application, permitted usage for the first application, an encryption level for the first application, location of the first user and citizenship of the first user.

16. The system of claim 12, comprising the data processing center to:
receive the encrypted tag and the encrypted first PII;
protect the first PII using at least one of: an access control list (ACL), an encryption level, configuration of expiry date of the first PII, and a sanitization algorithm, based on information in the tag; and
determine a geographical boundary within which the first PII is to be stored based on information in the tag;
store the first PII in a storage device within the geographical boundary; and
delete the first PII from the storage device in response to completion of the expiry date.

17. A non-transitory computer-readable medium comprising instructions, the instructions being executable by a processing resource of a hosting system to:
receive first Personally identifiable information (PII) of a first user from a first application hosted on the hosting system, wherein the first PII is to be part of call home data captured from the hosting system;
determine first security rules to be complied with for the first application;
determine second security rules to be complied with for the first user;
responsive to the determination of the first security rules and the determination of the second security rules, add a first metadata tag and a second metadata tag to the first PII, the first metadata tag comprising information of the first security rules and the second metadata tag comprising information of the second security rules;
to prevent unauthorized access, protect the first PII to provide a protected first PII, protect the first metadata tag to provide a protected first metadata tag, and protect the second metadata tag to provide a protected second metadata tag; and
transmit, in response to a determination to transmit the call home data, the protected first PII, the protected first metadata tag, and the protected second metadata tag to a data processing center.

18. The non-transitory computer-readable medium of claim 17, comprising instructions executable by the processing resource to:
receive second PII of a second user from the first application;
add the first metadata tag to the second PII; and
add a third metadata tag to the second PII,
wherein the third metadata tag comprises information of security rules to be complied with for the second user.

19. The non-transitory computer-readable medium of claim 18, comprising instructions executable by the processing resource to:
receive third PII of a third user from a second application hosted on the hosting system;
add a fourth metadata tag to the third PII, the fourth metadata tag being indicative of security rules that are to be complied with for the second application; and
add a fifth metadata tag to the third PII, the fifth metadata tag being indicative of security rules that are to be complied with for the third user.

20. The non-transitory computer-readable medium of claim 17, comprising instructions executable by a processing resource of a data processing center to:
receive the protected first PII, protected first metadata tag, and protected second metadata tag; and handle the first PII based on the first metadata tag and the second metadata tag to comply with the first security rules and the second security rules.

\* \* \* \* \*